United States Patent [19]
Johnson

[11] Patent Number: 5,404,713
[45] Date of Patent: Apr. 11, 1995

[54] SPILLAGE DRAG AND INFRARED REDUCING FLADE ENGINE

[75] Inventor: James E. Johnson, Hamilton, Ohio

[73] Assignee: General Electric Company, Cincinnati, Ohio

[21] Appl. No.: 131,511

[22] Filed: Oct. 4, 1993

[51] Int. Cl.⁶ ............................................. F02K 3/075
[52] U.S. Cl. .................................... 60/204; 60/226.3; 60/39.5
[58] Field of Search .............. 60/204, 224, 225, 226.1, 60/226.3, 39.5

[56] References Cited

U.S. PATENT DOCUMENTS

| | | |
|---|---|---|
| 2,940,252 | 6/1960 | Reinhart . |
| 3,210,934 | 10/1965 | Smale ................................. 60/39.5 |
| 3,296,800 | 1/1967 | Keenan et al. . |
| 3,449,914 | 6/1969 | Brown ................................. 60/225 |
| 3,792,584 | 2/1974 | Klees . |
| 3,841,091 | 10/1974 | Sargisson et al. . |
| 3,854,286 | 12/1974 | Klees . |
| 3,879,941 | 4/1975 | Sargisson . |
| 3,886,737 | 6/1975 | Grieb ................................. 60/226.1 |
| 3,910,375 | 10/1975 | Hache et al. . |
| 3,915,413 | 10/1975 | Sargisson . |
| 3,970,252 | 7/1976 | Smale et al. . |
| 3,981,143 | 9/1976 | Ross et al. . |
| 3,990,638 | 11/1976 | Johnson . |
| 4,004,416 | 1/1977 | Amelio et al. . |
| 4,026,472 | 5/1977 | Rabone . |
| 4,043,121 | 8/1977 | Thomas et al. ...................... 60/226.1 |
| 4,050,242 | 9/1977 | Dusa . |
| 4,064,692 | 12/1977 | Johnson et al. . |
| 4,066,214 | 1/1978 | Johnson . |
| 4,069,661 | 1/1978 | Rundell et al. . |
| 4,086,761 | 5/1978 | Schaut et al. . |
| 4,095,417 | 6/1978 | Banthin . |
| 4,136,518 | 1/1979 | Hurley et al. . |
| 4,214,441 | 7/1980 | Mouritsen et al. . |
| 4,290,262 | 9/1981 | Wynosky et al. . |
| 4,791,783 | 12/1988 | Neitzel ................................. 60/226.3 |
| 4,993,663 | 2/1991 | Lahti et al. . |
| 5,054,288 | 10/1991 | Salemann . |
| 5,058,617 | 10/1991 | Stockman et al. . |
| 5,074,118 | 12/1991 | Kepler . |

OTHER PUBLICATIONS

Jet Propulsion for Aerospace Applications, Second Edition, by Walter J. Hesse and Nicholas V. S. Mumford, Jr. Chapter 5.5 entitled "Mass-Flow Ratio or Area Ratio" on pp. 111–114.

Primary Examiner—Louis J. Casaregola
Attorney, Agent, or Firm—Jerome C. Squillaro; David L. Narciso

[57] ABSTRACT

A FLADE aircraft gas turbine engine having a FLADE duct circumscribing a preferably variable cycle inner gas turbine engine and having a FLADE fan disposed in the FLADE duct and radially outward of and drivenly connected to a first fan disposed in a first fan duct of the inner engine. The annular inlet of the first fan duct is sized to receive essentially the full mass airflow of the engine at full power conditions with the annular FLADE duct inlet essentially closed off. The engine is further designed and operable to fully open the inlet of the flade duct at predetermined part power flight conditions and essentially close it at full power conditions such as take off. An infra-red (IR) radiation shielding apparatus is disposed in the exhaust duct of the engine to block infra-red radiation emitting hot metal surfaces of the engine from view through an exhaust outlet of the exhaust duct and is cooled by air flow from the FLADE duct. The IR radiation shielding apparatus of one embodiment is constructed of a plurality of circumferentially disposed hollow vanes supporting an essentially hollow centerbody. The hollow vanes are operable to receive cooling air from the FLADE duct and flow it on to the hollow centerbody which exhausts the spent cooling air through a variable throat centerbody nozzle.

14 Claims, 2 Drawing Sheets

SPILLAGE DRAG AND INFRARED REDUCING FLADE ENGINE

BACKGROUND OF THE INVENTION

1. Field of the Invention

This invention relates to FLADE aircraft gas turbine engine and more particularly to construction and operating method of such an engine to reduce inlet spillage drag and reduce the infrared signature of the aircraft and aircraft engine.

2. Description of Related Art

A considerable effort has been made toward developing high performance variable cycle gas turbine engines. These types of engines have a unique ability to operate efficiently at various thrust settings and flight speeds both subsonic and supersonic. An important feature of the variable cycle gas turbine engine which contributes to its high performance is its capability of maintaining a substantially constant inlet airflow as its thrust is varied. This feature leads to important performance advantages under less than full power engine settings or maximum thrust conditions, such as during subsonic cruise. The effect of maintaining inlet airflow as thrust is reduced is to decrease such performance penalties as inlet spillage drag and afterbody closure drag, both of which have a considerable detrimental effect on the overall efficiency, size, weight, and performance of the aircraft and its engine.

Certain variable cycle engines, such as those described in U.S. Pat. Nos. 4,068,471 and 4,285,194, assigned to the same assignee as the present invention, achieve relatively constant airflow as thrust is varied by changing the amount of fan bypass flow with a valve system referred to as a variable area bypass injector (VABI). As engine thrust is decreased, the VABI increases bypass flow to offset decreasing core engine flow resulting in a relatively constant total engine flow, thus exhibiting the performance benefits described above. However, it uses very expensive multi-stage fan air to do so. Furthermore, it is somewhat limited in its ability to ingest the air at subsonic part power engine settings and engine operation because it has to be sized to match the flow conditions in the bypass duct into which is dumped some very highly pressurized air. This fan air is divided between the core flow and the bypass flow and therefore is controlled by the various bypass flow control mechanisms such as the VABI's. This in turn limits the degree to which the bypass air can be used to avoid spillage. Typically, conventional variable cycle engines have a limited range of thrust settings for a given Mach No. (particularly subsonic levels e.g. Mach No.=0.8-0.9) through which essentially constant airflow can be maintained and specific fuel consumption can be minimized. Therefore, it is desirable to construct and operate an aircraft gas turbine engine able to maintain inlet airflow at subsonic part power thrust settings more efficiently and over a broader flight envelope than is available in the prior art.

One particular type of variable cycle engine called a FLADE engine (FLADE being an acronym for "fan on blade") is characterized by an outer fan driven by a radially inner fan and discharging its flade air into an outer fan duct which is generally co-annular with and circumscribes an inner fan duct circumscribing the inner fan. One such engine, disclosed in U.S. Pat. No. 4,043,121, entitled "Two Spool Variable Cycle Engine", by Thomas et al., provides a flade fan and outer fan duct within which variable guide vanes control the cycle variability by controlling the amount of air passing through the flade outer fan duct.

There remains an important need to provide a high performance aircraft gas turbine engine, particularly of the variable cycle type, that is capable of maintaining an essentially constant inlet airflow over a relatively wide range of thrust at a given set of subsonic flight ambient conditions such as altitude and flight Mach No. in order to avoid spillage drag and to do so over a range of flight condition. This capability is particularly needed for subsonic part power engine operating conditions.

This invention also relates to an apparatus for suppressing and masking infrared (IR) emissions from engine exhaust ducts. The successful operation of combat aircraft is dependent, in part, upon the ability of the aircraft to remain undetected by infrared sensors of missiles during flight. The high temperatures of the engine's exhaust gases and the hot metal turbine parts and the hot metal walls directly in contact with the hot gases cause the engine to emit high levels of infrared energy. Military aircraft engaged in combat are vulnerable to anti-aircraft missiles employing highly sophisticated infrared sensors.

A number of apparatus have been designed to reduce infrared emissions from gas turbine engines. Each type of design endeavors to provide a combination of aerodynamics, heat transfer, and geometry which will result in an effective IR suppressor for the least suppressor weight and power effects on a turbine engine. One of these types of geometries utilizes a concentric center body within an annular duct. This suppressor geometry is referred to as a plug or center body suppressor and exemplified by U.S. Pat. Nos. 4,214,441, 4,044,555, 3,970,252 and the like. The plug suppressors are supported and fed cooling air from fan and/or high pressure bleed air aerodynamically shaped struts which are also used to position and support the center body. These hollow centerbody plug suppressors consume expensive fan and compressor air engine and power and result in reduced engine efficiency and combat operating radius.

The present invention provides a low power means of using a FLADE engine to improve overall engine efficiency and use the FLADE fan air as cooling air for IR suppression.

SUMMARY OF THE INVENTION

A FLADE aircraft gas turbine engine having a FLADE duct circumscribing a preferably variable cycle inner gas turbine engine and having a FLADE fan disposed in the FLADE duct and radially outward of and drivenly connected to a first fan disposed in a first fan duct of the inner engine. The annular inlet of the first fan duct is sized to receive essentially the full mass airflow of the engine at full power conditions with the annular FLADE duct inlet essentially closed off. The engine is further designed and operable to fully open the inlet of the flade duct at predetermined part power flight conditions and essentially close it at full power conditions such as take off. An infra-red (IR) radiation shielding apparatus is disposed in the exhaust duct of the engine to block infra-red radiation emitting hot metal surfaces of the engine from view through an exhaust outlet of the exhaust duct. The IR shielding apparatus is cooled by air flow from the FLADE duct.

One particular embodiment provides the (IR) radiation shielding apparatus a plurality of circumferentially disposed hollow vanes that are operable to receive cooling air from the FLADE duct and an essentially hollow centerbody that are operable to receive cooling air from the hollow vanes. The centerbody may be structurally supported by the hollow vanes and form part of the exhaust nozzle of the inner engine. Another embodiment provides the centerbody with a variable throat centerbody nozzle operable to exhaust cooling air received from the hollow vanes from the interior of the centerbody.

One particular embodiment provides the engine with a FLADE duct and first fan duct flow control means including variable stator vanes operable to open the FLADE duct as the first fan duct is closed and close the FLADE duct as the first fan duct is opened. The total inlet area of the engine is the sum of the annular areas of FLADE duct inlet and the first fan duct inlet wherein in another particular embodiment the FLADE duct inlet area is sized in a range of between 30%–40% of the first fan duct inlet area.

Another embodiment relates to the use of the present invention for a supersonic engine. The present invention operates the FLADE fan at about 5% of the inner engine airflow to receive essentially all of the boundary layer flow passing through the total FLADE engine inlet and pass it though the FLADE duct instead of through a separate bypass where it would decrease the overall engine efficiency.

Another feature of the present invention provides a means to use the airflow from the FLADE duct to do useful work such as a FLADE duct exhaust nozzle at the end of the FLADE duct for additional thrust which helps offset the additional cost and weight penalties of the FLADE fan and duct. The FLADE fan airflow can also be used to cool parts of the engine.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
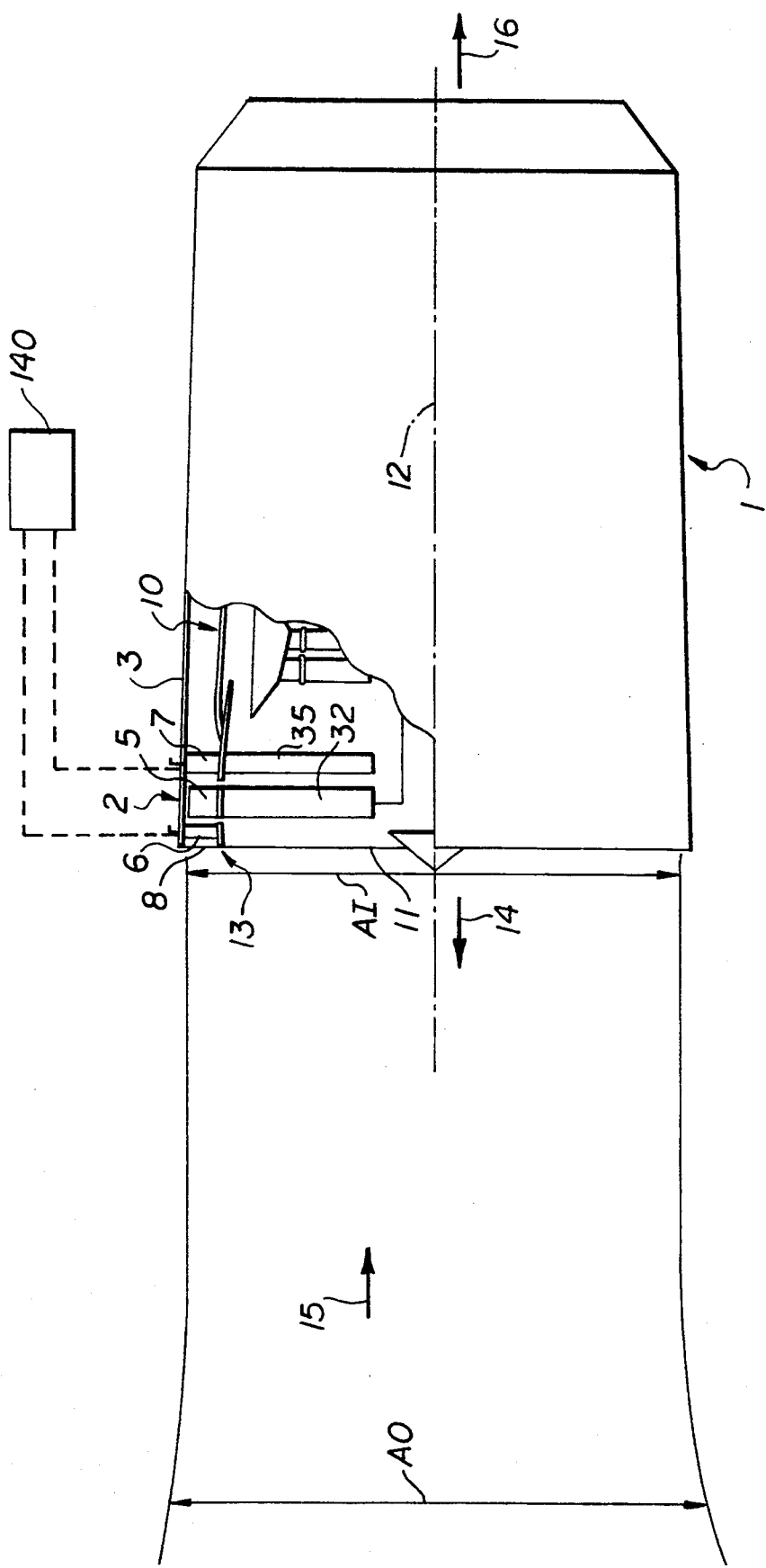
FIG. 1 is a schematic side view of a FLADE aircraft gas turbine engine with a schematic partial cutaway cross-sectional view of its inlet in accordance with one embodiment of the present invention.

Illustrated in FIG. 1 is a FLADE aircraft gas turbine engine 1 having a FLADE fan 2 disposed in a FLADE duct 3. The FLADE fan 2 is illustrated as having a row of FLADE fan blades 5 disposed between a axially forward row of variable first FLADE vanes 6 and a axially aft row of variable second FLADE vanes 7. The FLADE fan 2 is disposed downstream of an annular FLADE inlet 8 to the FLADE duct 3. The FLADE duct 3 generally circumscribes a preferably variable cycle turbofan inner engine 10 having an annular inner engine inlet 11 and a generally axially extending axis or centerline 12 generally extending forward 14 and aft 16. The FLADE inlet 8 and the inner engine inlet 11 in combination generally form a FLADE engine inlet 13 having a FLADE engine inlet area AI.

One important criterion of inlet performance discussed is the ram recovery factor. A good inlet must have air-handling characteristics which are matched with the engine, as well as low drag and good flow stability. The importance of the air-flow matching characteristics can be shown from the area considerations of FIG. 1, which for the FLADE engine inlet 13 includes a free stream flow area A0 and the FLADE engine inlet area AI through which the total engine airflow passes. For a given set of operating flight conditions, the airflow requirements are fixed by the pumping characteristics of the FLADE engine 1. If AI is too small to handle the air, the engine must "suck in" the lacking amount of air resulting in a decreased ram recovery. If AI is too large, the FLADE engine inlet 13 will supply more air than the engine can use resulting in excess drag (spillage drag) because we must either by-pass the excess air around the engine or "spill" it back out of the inlet. Too much air or too little air is detrimental to inlet performance. The present invention provides the FLADE fan 2 and the FLADE duct 3 to avoid the spillage and the variable first FLADE vanes 6 and optionally the variable second FLADE vanes 7 to avoid the excess sucking and spillage and the resulting decreased ram recovery and spillage drag respectively.

The inner engine inlet 11 is sized to receive essentially the full airflow 15 of the engine at full power conditions with the FLADE engine inlet 13 essentially closed off by closing the variable first FLADE vanes 6 and the variable second FLADE vanes 7. The engine is further designed and operable to fully open the inlet of the flade duct at predetermined part power flight conditions and essentially close it at full power conditions such as take off.

Figure 2:
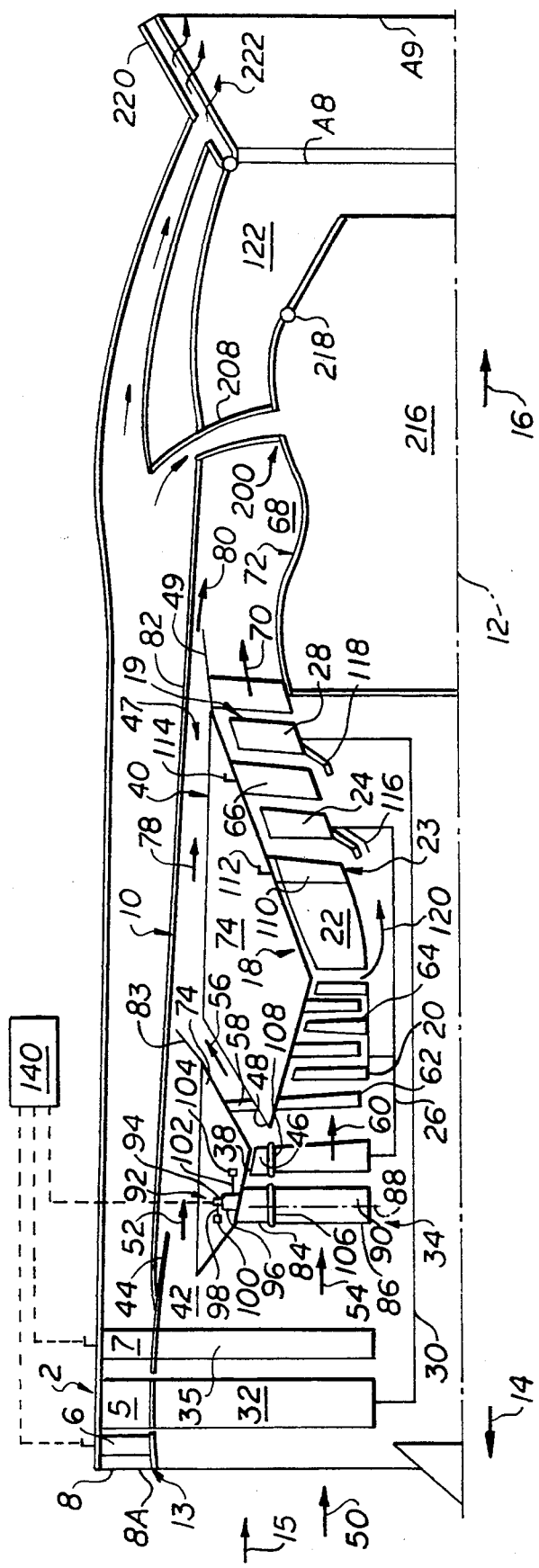
FIG. 2 is a schematic cross-sectional view of the FLADE aircraft gas turbine engine in FIG. 1 and IR shielding apparatus in accordance with one embodiment of the present invention.

The exemplary embodiment of the present invention is illustrated in FIG. 2 as having a variable cycle inner engine 10 in terms sufficient to understand its operation and that of the present invention. Note that may different types of variable cycle engines as well as non-variable cycle turbofan and turbojet inner engines may be used for the purpose of this invention. The bypass turbofan inner engine 10 further includes a core engine (also called a gas generator) 18 which comprises a high pressure compressor 20, a combustor 22, and a high pressure turbine 23 having a row of turbine rotor blades 24, all arranged in a serial, axial flow relationship. A high pressure shaft 26, disposed coaxially about the centerline 12 of the inner engine 10, fixedly interconnects the high pressure compressor 20 and the high pressure turbine blades 24. The core engine 18 is effective for generating combustion gases. Pressurized air from the high pressure compressor 20 is mixed with fuel in the combustor 22 and ignited, thereby generating combustion gases. Some work is extracted from these gases by the high pressure turbine blades 24 which drives the high pressure compressor 20. The combustion gases are discharged from the core engine 18 into a low pressure turbine 19 having a row of turbine rotor blades 28.

The low pressure turbine blades 28 are fixedly attached to a low pressure shaft 30 which is disposed coaxially about the centerline 12 of the inner engine 10 within the high pressure shaft 26. The low pressure shaft 30 rotates a more axially forward first fan illustrated as a more axially forward first row of generally radially outwardly extending and circumferentially spaced-apart fan rotor blades 32. The high pressure shaft 26 also rotates a more axially aft second fan illustrated as a axially aft row of circumferentially spaced apart second fan rotor blades 36 having generally radially outwardly extending blade tips 38. The more axially aft row of fan rotor blades 36 is disposed axially aft of the more axially forward row of fan rotor blades 32. A row of circumferentially spaced-apart fan stator vanes 34 (attached at either or both radial ends) is disposed axially between the more forward and more aft rows of fan rotor blades 32 and 36 and axially adjacent the more aft row of fan rotor blades 36.

Note that the fans may be multi-staged having one or more additional rows of fan rotor blades and/or fan stator vanes disposed axially forward of the more forward row of fan rotor blades 32 and/or axially between the more forward row of fan rotor blades 32 and the row of fan stator vanes 34. The only additional row shown in the Figures is an optional preferred row of fan stator vanes 35 disposed axially adjacent and axially aft of the more forward row of fan rotor blades 32. By "axially adjacent" is meant that there are no other rotor blade rows and/or stator vane rows between the named axially adjacent elements (i.e., between the more forward row of fan rotor blades 32 and the optional additional row of fan stator vanes 35).

The row of FLADE fan blades 5 is disposed radially outward of, operably connected to, and driven by the first fan illustrated by the axially forward first row of fan rotor blades 32. The axially forward row of variable first FLADE vanes 6 and the axially aft row of variable second FLADE vanes 7 are used to control the amount of FLADE airflow allowed into the FLADE inlet 8 and the FLADE duct 3. Whatever inlet airflow that cannot be ingested through the inner engine inlet 11 and the FLADE inlet 8 is spilled out of the combined FLADED engine inlet 13 thereby causing spillage drag and forebody drag. The present invention avoids these two additive drag components by providing a FLADE inlet annular area 8A that is sized to allow the FLADE inlet 8 to essentially fully receive spillage air from the inner engine inlet 11 using a FLADE fan control system 140. The FLADE fan control system 140 provides a FLADE vane control means to control the opening and closing of the FLADE duct 3 by opening and closing the first FLADE vanes 6, and optionally the aft row of variable second FLADE vanes 7, at a predetermined part power thrust setting of the engine 1. The FLADE fan control system 140 is also used to essentially close the vanes at a predetermined full power thrust setting of the engine. Furthermore the FLADE inlet annular area 8A is sized to be a fraction of an inner engine inlet annular area 11A of the inner engine inlet 11 that is sufficient to receive the a predetermined maximum amount of spillage air spilled from inner engine inlet 11. Note that additional rows of FLADE fan blades and corresponding variable FLADE vanes are also contemplated by the present invention.

A fan bypass duct 40 has a first inlet 42 disposed axially between the more forward row of fan rotor blades 32 and the row of fan stator vanes 34. When the optional additional row of fan stator vanes 35 is present, the first inlet 42 is disposed axially between the optional additional row of fan stator vanes 35 and the row of fan stator vanes 34. The first inlet 42 includes a front variable area bypass injector (VABI) door 44. The fan bypass duct 40 has a second inlet 46 and an outlet 47. The second inlet 46 includes a axially aft portion with a flow splitter leading edge 48 disposed axially adjacent and axially aft of the more aft row of fan rotor blades 36 and radially inward of their blade tips 38. There are no other rotor blade rows and/or stator vane rows between the flow splitter leading edge 48 and the more aft row of fan rotor blades 36. The fan bypass duct outlet 47 is disposed axially aft of the second inlet 46 and includes a rear variable area bypass injector (VABI) door 49.

The full airflow 15 is split between the FLADE inlet 8 and the inner engine inlet 11. An inner engine airflow 50 passes through the inner engine inlet 11 and then the more forward row of fan blades 32. A first bypass air portion 52 of the inner engine airflow 50 passes through the first inlet 42 of the fan bypass duct 40 (when the front VABI door 44 is open) and with the remaining air portion 54 passing through the row of fan stator vanes 34 and the more aft row of fan blades 36. The remaining air portion 54 is then split into a second bypass air portion 56, which passes through the second inlet 46 and past a row of bypass stator vanes 58, and a core air portion 60 which passes through: the stator vanes 62 and rotor blades 64 of the high pressure compressor 20; the combustor 22; the row of high pressure turbine blades 24; a row of turbine stator vanes 66; and the row of low pressure turbine blades 28. The core air portion 60 enters an engine exhaust duct 68 as core discharge airflow 70 between a centerbody 72 and an engine inner casing 74. The combined bypass air 78 (first bypass air portion 52 plus second bypass air portion 56) enters the engine exhaust duct 68 as bypass discharge flow 80 past the low pressure turbine blades 28 between the engine inner casing 74 and the engine outer casing 82. Preferably, the fan bypass duct 40 includes an intermediate mixer door 83 which is disposed axially between the second inlet 46 and the outlet 47 and which is positionable for proportionally varying the flow rates from the first and second inlets 42 and 46 downstream of the intermediate mixer door 83.

Means are provided for independently varying the flow area of a radially outer portion and a radially inner portion of the fan vanes 34. Preferably such means include at least one of the fan stator vanes 34 having a variable, radially outer portion 84 and an independently variable, radially inner portion 86. Preferably, the radially outer portion 84 includes a pivotable, trailing-edge flap 88 and the radially inner portion 86 includes an independently pivotable, trailing-edge flap 90.

Other variable portion designs include: designs wherein the entire outer portion and the entire inner portion are independently pivotable; designs wherein inner and outer side flaps are independently pivotable away from stationary main inner and outer portions; designs wherein inner and outer side flaps are independently, generally axially slidable proximately along stationary main inner and outer portions; and designs wherein inner and outer plugs are generally radially extended between circumferentially adjacent inner portions and circumferentially adjacent outer portions, and the like.

Means 92 are provided for independently varying the radially outer portion 84 and the radially inner portion 86. Preferably, such varying means 92 includes means for independently pivoting the flaps 88 and 90. Other such varying means for non-pivotable, fan stator vane designs include axially moving unison rings and those means known for mechanical clearance control in jet engines (i.e., mechanically moving circumferentially surrounding shroud segments radially towards and away from a row of rotor blade tips to maintain a constant clearance despite different rates of thermal expansion and contraction). Additional such varying means for non-pivotable, fan stator vane designs include those known for extending and retracting wing flaps on airplanes and the like. Preferably, such pivoting means includes an inner shaft 94 coaxially disposed within an outer shaft 96, the inner shaft 94 turned by a lever arm 98 actuated by a unison ring 100 and the outer shaft 96 turned by a separate lever arm 102 actuated by a separate unison ring 104, with the inner shaft 94 attached to the pivotable trailing edge flap 90 of the inner portion 86 of the fan stator vane 34 and the outer shaft 96 attached to the pivotable trailing edge flap 88 of the outer portion 84 of the fan stator vane 34. It is noted that the lever arms 98 and 102 and the unison rings 100 and 104 are all disposed radially outward of the fan stator vanes 34. Other such pivoting means include those known for pivoting variable stator vanes of high pressure compressors in jet engines, and the like.

In an exemplary embodiment, the fan stator vane 34 includes a mid shroud 106 generally aligned with the flow splitter leading edge 48. Preferably, the mid shroud 106 is a full-chordal mid shroud. Also in an exemplary embodiment, the fan rotor blades 36 include a mid shroud 108 generally aligned with the flow splitter leading edge 48. Preferably, the mid shroud 108 is a full-chordal mid shroud.

In the exemplary embodiment of FIG. 1, the at least one fan stator vane 34 includes all of the fan stator vanes 34 in its row having a variable, radially outer portion 84 and an independently variable, radially inner portion 86. Here the varying means 92 preferably would vary all of the radially outer portions 84 as a group and independently vary all of the radially inner portions 86 as a separate group.

A row of high pressure turbine (HPT) nozzle stator vanes 110 is disposed axially aft of the second inlet 46 of the fan bypass duct 40. Means are provided for varying the flow area of the HPT nozzle vanes 110. Preferably, such means include at least one (and preferably all) of the HPT nozzle vanes 110 being a variable vane, and preferably a pivotable vane with an actuation lever 112 for pivoting the vanes 110. Other such means have been previously discussed with respect to varying the flow area of the fan stator vanes 34.

FIG. 1 shows only one row of high pressure turbine rotor blades 24, only one row of low pressure turbine rotor blades 28, and only one row of turbine stator vanes 24, although additional rows of turbine rotor blades and stator vanes may be included in the design of a particular engine. In one preferred embodiment of the present invention, as shown in FIG. 1, a axially aft most row of high pressure turbine rotor blades 24 is disposed axially aft of the row of high pressure turbine nozzle stator vanes 110. A axially forward most row of low pressure turbine rotor blades 28 is disposed axially aft of the aft row of high pressure turbine blades 24. A row of low pressure turbine nozzle stator vanes 66 is disposed axially between the aft row of high pressure turbine blades 24 and the forward row of low pressure turbine blades 28. Means are provided for varying the flow area of the low pressure turbine (LPT) nozzle vanes 66. Preferably, such means include at least one (and preferably all) of the LPT nozzle vanes 66 being a variable vane, and preferably a pivotable vane with an actuation lever 114 for pivoting the vanes 66. Other such means have been previously discussed with respect to varying the flow area of the fan stator vanes 34. The LPT nozzle vanes 66 would be present if the HPT blades 24 and the LPT blades 28 rotated in the same direction to take the swirl imparted by the HPT blades 24 out of the flow. Having the LPT nozzle vanes 66 be variable allows for more efficient engine operation just as for the variable HPT nozzle vanes 110 previously discussed. This combination of features improves part power specific fuel consumption, as can be appreciated by those skilled in the art.

Although not illustrated in the Figures an alternate embodiment provides for the HPT blades 24 and the LPT blades 28 to are counter-rotate relative to each other which allows the row of LPT nozzle stator vanes 66 to be omitted, if desired, since the swirled exit flow from the HPT blades 24 is correctly angled with respect to the counter-rotating LPT blades 28.

The inner engine 10 can include a turbine cooling air modulation system utilized when the inner engine is operating at reduced power setting for added inner engine efficiency, such as those described in (but not limited to) U.S. Pat. No. 4,296,599 or 4,807,433, as can be appreciated by those skilled in the art. The variable pressure ratio core fan tip coupled with cooling air modulation results in a change in HPT exit swirl. This swirl change in a counter-rotating HPT and LPT design results in an aerodynamically induced increase in LPT flow function that accompanies a mechanically reduced HPT flow function. This beneficial result eliminates the need for having to have a variable geometry feature in the LPT. Specifically, FIG. 1 discloses a turbine cooling air modulation system including an HPT double inducer 116 and an LPT inducer 118 each including a valve responsive to temperature change or to engine control commands which regulates the turbine cooling flow taken from compressor bleed air 120. The turbine cooling air modulation is provided to allow scheduled control of the quantity of compressor air used to cool both the HPT and LPT blades. High levels of flow are needed during maximum thrust operation while only a small fraction of this cycle performance penalty air is needed during part power operation. As mentioned, these modulators include multiple flow cooling air inducers 116 and 118 or supply pipes that contain flow control valves for modulation purposes. They may be located in the inner engine positions shown or elsewhere in the cooling air circuit.

In operation, as can be appreciated by those skilled in the art, the variable geometry fan features and the VABI and intermediate mixer doors permit bypass duct pressure levels to be controlled independently from core supercharging pressure levels. Also, the variable geometry turbine systems allow overall cycle pressure ratio to be controlled as turbine temperature varies to match the cycle balance requirements of the variable fan pressure ratio system. The variable geometry fan feature further allows the core fan tip pressure to be either phased in as thrust is increased from part to full power or phased out as thrust is reduced from full to part power. The ability to control the high pressure turbine flow function by mechanical means coupled with a corresponding aerodynamically derived change in LPT flow function are key elements of the invention. By adjusting the high and low pressure turbine flow functions, overall pressure can be maintained as fan pressure ratio is reduced from a very high level (full core fan tip pressure rise) to essentially front fan pressure ratio (core fan tip phased out). A very large change in turbine temperature accompanies the phase in/phase out of the core fan tip. Without a set of variable geometry turbines a large core speed change would occur with a corresponding reduction in cycle pressure ratio and loss of part power performance potentials. The potential specific fuel consumption improvement for this mode of operation is dependent on the maximum level of overall fan pressure ratio (5–7+) and the front fan design pressure level (3–4). Five to ten percent improvement should result for engines that have a maximum fan pressure ratio in the 5:1 class. Ten to fifteen percent part power specific fuel consumption improvements can result for engines that have a 6–7:1 maximum fan pressure level.

Specifically, from ground idle to intermediate thrust where maximum rotor speeds, full inner engine fan flow, and intermediate turbine temperatures occur, the inner engine 10 operates essentially as a conventional mixed flow turbofan. The front VABI doors 44 are opened, and the outer portion 84 (i.e., the trailing edge flap 88 of the outer portion 84) of the core fan stator vanes 34 are closed to a 60–80 degree inlet guide vane (IGV) setting. The HPT nozzle stator vanes 110 are closed to optimize compressor performance. If there are LPT nozzle stator vanes 66, as in FIG. 1, they will be set in an open setting to control HP-LP rotor speed relationships needed to optimize engine performance.

For counter-rotation vaneless designs the optimal LPT flow function changes result aerodynamically due to the varying HPT exit swirl and counter-rotation flow fields of the two close-coupled turbine rotors. The intermediate mixer door 83 minimizes losses between the outer and inner bypass streams 52 and 56 while the rear VABI door 49 is used to hold the required ratio of duct exit to core discharge pressure. A variable area engine exhaust nozzle 122 is disposed at the aft end of the engine exhaust duct 68 and is varied in area to obtain optimum part power engine performance. The exhaust nozzle 122 is as shown but not limited to a convergent divergent nozzle. The present invention also contemplates a variable convergent nozzle as well as a fixed area exhaust nozzle 122.

From intermediate to maximum power, the above settings are changed as the flow is increased to raise turbine temperatures. Now, the cooling air modulator valves are opened to increase flow to the turbine cooling circuit. The HPT nozzle stator vanes 110 are opened increasing HPT vane flow area to maintain adequate core stall margin. If there is an LPT nozzle stator vane 66, as in FIG. 1, it is closed to maintain HP speed. For counter-rotation vaneless designs the increased exit swirl from the HP turbine rotor blades 24 aerodynamically creates a closed flow function level for the LPT. (This process goes in the reverse direction when reducing thrust from a maximum level). The outer portion 84 (i.e., the trailing edge flap 88 of the outer portion 84) of the core fan stator vanes 34 is opened from a 60–80 degree level to a 0 (fully open) level as power is increased from intermediate to maximum. This increases the core fan tip pressure ratio and effectively uses the increased core energy created by the increased fuel flow to greatly increase the overall pressure level of the mixed exhaust gasses, resulting in a 20–30 percent increase in engine thrust. The front VABI doors 44 are closed at a power setting slightly above intermediate and are kept closed (defining single bypass operation). The intermediate mixer door 83 position is held constant. The rear VABI door 49 is used to control the pressure relationship between the duct and core discharge. The area of the variable exhaust nozzle 122 is reduced as overall nozzle pressure levels increase.

At the same time when the inner engine 10 is operated at part power the variable first FLADE vanes 6 and the variable second FLADE vanes 7 are opened, to avoid excess spillage and spillage drag, reaching their fully opened positions at part power subsonic cruise conditions. The FLADE fan control system 140 is operable to actuate, in a predetermined manner, the FLADE vanes in response to a set of measured and calculated inner engine operating conditions including throttle setting and flight operating conditions such as altitude and free stream Mach Number. The FLADE fan control system 140 can typically be the engine electronic control system programmed to actuate the vanes in accordance with the method of the present invention.

An infra-red (IR) radiation shielding apparatus 200 is disposed in the exhaust duct 68 of the FLADE aircraft gas turbine engine 1 to block infra-red radiation emitting hot metal surfaces of the engine, such as those of the high pressure turbine 23 and more particularly the low pressure turbine 19, from view through an exhaust outlet 69 of the exhaust duct. The IR shielding apparatus 200 is cooled by air flow from the FLADE duct 3. The IR radiation shielding apparatus 200 has a plurality of circumferentially disposed hollow vanes 208 which are in fluid communication with and operable to receive cooling air from the FLADE duct 3. The hollow vanes 208 structurally support and flow cooling air to the essentially hollow centerbody 72. The centerbody 72 forms part of the exhaust nozzle of the inner engine. The centerbody 72 includes a variable throat area centerbody nozzle 218 which is operable to exhaust cooling air received from the hollow vanes 208 from the interior 216 of the centerbody.

The hollow vanes 208 and the centerbody 72 may both be utilized to block infra-red radiation emitting hot metal surfaces of the FLADE aircraft gas turbine engine 1 to, such as those of the high pressure turbine 23 and more particularly the low pressure turbine 19, from view through the exhaust outlet 69 of the exhaust duct 68.

The air flow from the FLADE duct 3 may be used to provide cooling air to other parts of the engine, such as the engine's nozzle for example, to prevent thermal degradation. The nozzle may be a variable throat area nozzle having pivotable convergent flaps and seals to control a throat area A8 and pivotable divergent flaps and seals to control a nozzle exit area A9. The seals and flaps may be internally and/or externally cooled by this cooling air. The nozzle have a variable exit area A9 and a fixed throat area A8 such as the nozzle 122 in FIG. 2 with pivotable divergent flaps 220. Aft of the throat area A8 this cooling air may be used to film cool the divergent flaps 220 and/or seals through film cooling apertures 222 such as slots or holes, as long as the local pressure at that point is sufficiently below the pressure of the cooling air which is substantially that of the fan bleed air so as to allow it to flow into the nozzle flow stream.

The cooling air received from the FLADE fan duct may therefore be used to cool the IR radiation shielding apparatus 200 and parts of the engine's nozzle 122 without the engine 1 expending any additional energy to provide this cooling air. The engine of the present invention is therefore able to reduce drag more than sufficiently to compensate for the additional weight of the FLADE fan and duct and can than use this cooling air to reduce suppress the engine's IR radiation thus lowering the aircraft's IR signature and further use this cooling air to cool hot parts of the engine such as the nozzle and its flaps thereby reducing the amount of thermal degradation the engine would otherwise experience. This enhance the engine's life and save's fuel and engine power that would otherwise be needed to cool these parts.

The foregoing description of a preferred embodiment of the invention has been presented for purposes of illustration. It is not intended to be exhaustive or to limit the invention to the precise form disclosed, and obviously many modifications and variations are possible in light of the above teachings without departing from the scope of the invention as set forth in the appended claims.

I claim:

1. An aircraft FLADE gas turbine engine comprising:
    an inner gas turbine engine having at least one inner fan section with at least one row of inner fan blades disposed in an inner fan duct,
    a FLADE fan duct circumferentially disposed around said inner engine,
    a FLADE fan disposed in said FLADE duct,
    said FLADE fan having at least one row of FLADE fan blades radially outward of and drivenly connected to said inner fan section,
    said inner fan duct having an inner fan duct inlet and said FLADE fan duct having a FLADE fan duct inlet,
    a FLADE inlet airflow modulation means disposed in said FLADE fan duct to control airflow through said FLADE fan duct,
    wherein said inner fan duct inlet is sized to receive essentially the full mass airflow of the FLADE engine at a subsonic full power condition with said FLADE fan duct inlet essentially closed off,
    an engine inlet airflow control means operable to control said FLADE inlet airflow modulation means to fully open said FLADE fan duct inlet at a part power subsonic flight condition of the FLADE engine and essentially close said FLADE fan duct inlet at a full power subsonic flight condition of the FLADE engine, and
    an infra-red radiation shielding means disposed in the exhaust duct to block infra-red radiation emitting hot metal surfaces of the FLADE engine from view through an exhaust outlet of said exhaust duct, said infra-red radiation shielding means in cooling air flow receiving communication with said FLADE duct.

2. An aircraft FLADE gas turbine engine as claimed in claim 1 wherein said infra-red radiation shielding means comprises an essentially hollow centerbody operably connected to said FLADE duct for receiving cooling air from said FLADE duct.

3. An aircraft FLADE gas turbine engine as claimed in claim 2 wherein said infra-red radiation shielding means further comprises a plurality of circumferentially disposed hollow vanes operably connecting said FLADE duct to said hollow centerbody for receiving cooling air from said FLADE duct and flowing it through said hollow vanes to said centerbody.

4. An aircraft FLADE gas turbine engine as claimed in claim 3 wherein said centerbody is structurally supported by said hollow vanes.

5. An aircraft FLADE gas turbine engine as claimed in claim 4 wherein said centerbody includes a variable throat centerbody nozzle operable to exhaust cooling air received from said hollow vanes.

6. An aircraft FLADE gas turbine engine as claimed in claim 5 further comprising an engine nozzle disposed at about the end of the exhaust duct wherein said FLADE duct is operably connected to the engine nozzle to flow cooling air to cool the engine nozzle.

7. An aircraft FLADE gas turbine engine as claimed in claim 6 further wherein said engine nozzle further comprises divergent flaps operably connected to said FLADE duct to flow cooling air to cool said divergent flaps.

8. An aircraft FLADE gas turbine engine as claimed in claim 1 wherein said inner fan duct inlet has an inner fan duct inlet area and said FLADE fan duct inlet has a FLADE fan duct inlet area that is in a range of about between 30%–40% of said inner fan duct inlet area.

9. An aircraft FLADE gas turbine engine as claimed in claim 8 wherein said part power flight condition is a cruise condition.

10. An aircraft FLADE gas turbine engine as claimed in claim 9 wherein said FLADE inlet airflow modulation means comprises a row of variable angle FLADE vanes disposed forward of said FLADE fan.

11. An aircraft FLADE gas turbine engine as claimed in claim 6 wherein said inner gas turbine engine is a variable cycle engine.

12. A method of operating an aircraft FLADE gas turbine engine, said method comprising the following steps:
    a) providing an aircraft FLADE gas turbine engine having an inner gas turbine engine having at least one inner fan section with at least one row of inner fan blades disposed in an inner fan duct,
        a FLADE fan duct circumferentially disposed around said inner engine,
        a FLADE fan disposed in said FLADE duct,
        said FLADE fan having at least one row of FLADE fan blades radially outward of and drivenly connected to said inner fan section,
        said inner fan duct having an inner fan duct inlet and said FLADE fan duct having a FLADE fan duct inlet,
        a FLADE inlet airflow modulation means disposed in said FLADE fan duct to control airflow through said FLADE fan duct,
        wherein said inner fan duct inlet is sized to receive essentially the full mass airflow of the FLADE engine at a full power subsonic flight condition with said FLADE fan duct inlet essentially closed off,
    b) operating said FLADE engine at takeoff with said FLADE inlet airflow modulation means essentially fully closed, and
    c) flowing airflow from said FLADE fan duct to an infra-red radiation shielding means disposed in an exhaust duct of the FLADE engine to block infra-red radiation emitting hot metal surfaces of the engine from view through an exhaust outlet of the exhaust duct.

13. A method as claimed in claim 12 further comprising step:
    c) operating said FLADE engine at a part power flight condition with said FLADE inlet airflow modulation means fully open.

14. A method as claimed in claim 12 further comprising step:
    d) flowing cooling air from the FLADE fan duct to an engine nozzle to cool the engine nozzle.

* * * * *